(12) United States Patent
Wates et al.

(10) Patent No.: US 6,540,822 B2
(45) Date of Patent: Apr. 1, 2003

(54) POLYBETAINES AS ASPHALT EMULSIFIERS

(75) Inventors: Julia Mary Wates, Chicago, IL (US); Alan James, Naperville, IL (US)

(73) Assignee: Akzo Nobel N.V., Arnhem (NL)

( * ) Notice: Subject to any disclaimer, the term of this patent is extended or adjusted under 35 U.S.C. 154(b) by 211 days.

(21) Appl. No.: 09/812,318

(22) Filed: Mar. 20, 2001

(65) Prior Publication Data

US 2002/0183401 A1 Dec. 5, 2002

(51) Int. Cl.[7] .......................... B01F 17/28; C08L 95/00; C08L 195/00
(52) U.S. Cl. ......................... 106/277; 106/283; 516/43; 516/45; 516/914; 516/916
(58) Field of Search .......................... 516/43, 45, 914, 516/916; 106/277, 283

(56) References Cited

U.S. PATENT DOCUMENTS

| | | | | |
|---|---|---|---|---|
| 2,129,264 A | * | 9/1938 | Downing et al. | 516/43 X |
| 3,555,079 A | | 1/1971 | Marumo et al. | |
| 4,209,337 A | | 6/1980 | Wagner et al. | 106/96 |
| 4,629,757 A | | 12/1986 | Esser et al. | 524/457 |
| 5,667,577 A | * | 9/1997 | Chatterjee et al. | 106/277 |
| 6,034,271 A | | 3/2000 | Kwetkat | 562/565 |
| 6,197,837 B1 | * | 3/2001 | Hill et al. | 516/43 X |

FOREIGN PATENT DOCUMENTS

| | | | |
|---|---|---|---|
| DE | 1180300 | 10/1964 | ........... C08H/25/06 |
| WO | WO 99/54413 | 10/1999 | ............. C09D/5/08 |
| WO | WO 00/21918 | 4/2000 | ......... C07C/219/06 |

OTHER PUBLICATIONS

Amphoteric Surfactants, Second Edition, Eric G. Lomax 1996 pp. 78–84.
Abstract for Soviet Union Patent No. SU 566.833.

* cited by examiner

*Primary Examiner*—Richard D. Lovering
(74) *Attorney, Agent, or Firm*—Ralph J. Mancini

(57) ABSTRACT

A method of emulsifying asphalt using a polyamine polybetaine, preferably a dibetaine, as an emulsifier or co-emulsifier and an emulsion of asphalt, water and a polybetaine, preferably a diamine dibetaine. The advantages of using a polyamine polybetaine as an emulsifier or co-emulsifier include its ability to provide superior cationic and anionic emulsions, and slow-setting emulsions at low use levels, and the excellent adhesion of the cured asphalt film.

20 Claims, No Drawings

POLYBETAINES AS ASPHALT EMULSIFIERS

FIELD OF THE INVENTION

The present invention generally relates to the use of polybetaines as asphalt emulsifiers. More particularly, the invention concerns an improved process for stabilizing an asphalt in water emulsion using certain polybetaines as an asphalt emulsifier.

BACKGROUND OF THE INVENTION

Asphalt in water emulsions are used for road construction and repair, as well as in the construction industry as coatings and sealers. The asphalt properties are obtained after the emulsions set or cure, when the droplets of asphalt coalesce and adhere to the substrate and water is removed.

The rate of this setting process depends on the reactivity of the emulsion and the reactivity of the substrate. Emulsions are classified as rapid, medium and slow-setting types depending on their reactivity. Slow-setting emulsions find use in applications, such as cold mix, where the emulsion is mixed with aggregate and the mixture is used to pave a roadway.

Emulsions can be classified into cationic or anionic types depending on the charge on the asphalt droplets. Cationic emulsions are used for siliceous aggregates, like quartz, since such aggregates have negatively charged surfaces. The cured film from cationic emulsions generally adheres much better to siliceous aggregates than does the cured film from anionic emulsions. Generally, different emulsifiers are used for cationic emulsions than are used for anionic emulsions.

Nonionic emulsifiers, such as ethoxylated nonylphenols, can be used as part of an emulsifier or alone in both cationic and anionic slow-setting emulsions. However, at use levels comparable to the inventive emulsifier, the anionic and cationic slow-setting emulsions of ethoxylated nonylphenols are deficient in quality. Additionally, films of asphalt derived from such emulsions tend to strip off the aggregate when soaked in water.

The asphalt residues (i.e. after curing of the emulsion) from slow-setting asphalt emulsions, especially slow-setting anionic emulsions, show poor adhesion to aggregates such as quartzite. The result is poor durability of road materials prepared using these emulsions. Moreover it is necessary to use different chemicals to produce anionic and cationic slow setting asphalt emulsions.

The asphalt residues from slow-setting emulsions prepared from the polybetaine emulsifiers of the invention, however, show good adhesion and have particularly better adhesion than the residues derived from slow-setting cationic, anionic or nonionic emulsions prepared with the commonly-used nonylphenolethoxylate emulsifiers.

SUMMARY OF THE INVENTION

The present invention, generally relates to a method of emulsifying asphalt using a novel asphalt emulsifier, an asphalt emulsion containing the novel asphalt emulsifier, and a cold mix of the asphalt emulsion containing the novel asphalt emulsifier. The method emulsifies a mixture of asphalt and water by adding an emulsifying effective amount of a novel asphalt emulsifier of at least one polyamine polybetaine.

The invention is especially useful in slow setting emulsions, since lower use levels are required when using the inventive emulsifier and the emulsifier can be used for either anionic or cationic slow setting emulsions depending on whether an acid or alkaline water phase is used. Both the cationic and anionic slow setting asphalt emulsions are of good quality and meet the requirements of slow setting grades at low use levels. The cured asphalt residue from emulsions made with the inventive emulsifier adhere better to aggregates than the asphalt residue from emulsions prepared with nonionic nonylphenolethoxylate emulsifiers.

Further, the emulsions of the present invention can be used for cold mix, where they exhibit advantages compared with a conventional cationic mixing grade emulsifier. Additionally, the inventive asphalt emulsifiers are compatible with both cationic and anionic co-emulsifiers, especially when combined with co-emulsifiers conventionally used for medium and rapid-setting emulsions. It is, thus, very economical to use the inventive asphalt emulsifiers, since lower use levels are required and it is only necessary to stock a single emulsifier for both anionic and cationic emulsions and for slow setting emulsions.

These and other objects of the invention are readily apparent from the following disclosure.

DETAILED DESCRIPTION OF THE INVENTION

The present invention utilizes one or more polyamine polybetaines, preferably dibetaines derived from N-alkyl-1,3-propylene diamines as asphalt emulsifiers or co-emulsifiers. The emulsions formed using the inventive process meet the requirements for slow setting emulsions specified by the American Society for Testing and Materials (ASTM) and others, as demonstrated by the examples herein.

The asphalt emulsifiers of the present invention can be represented by the following formula I. It is understood that when representing the chemical structure of the (poly) betaines in the present specification that such structures implicitly include protonated or partially protonated acid salt(s) of the betaines formed when the betaine is acidified, as well as unprotonated forms.

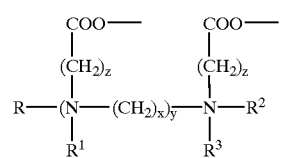

Formula I wherein R is a $C_8$–$C_{24}$ hydrocarbon radical, preferably a $C_8$–$C_{22}$ alkyl, alkenyl or mixture thereof, or a group of the formula $R^4$—O—$CH_2CH_2CH_2$, where $R^4$ is a $C^6$–$C^{20}$ hydrocarbon radical, preferably a $C_8$–$C_{18}$ alkyl or alkenyl group; $R^1$, $R^2$ and $R^3$ are, independently, a $C_1$–$C_6$ alkyl or alkanol, preferably methyl, ethyl, ethanol, propanol, polyethoxyethanol, carboxyethyl or carboxymethyl in any combination, and more preferably methyl, ethanol, or polyethoxyethanol in any combination; x is an integer equal to or greater than 1; and y is an integer equal to or greater than 1, with y+1 indicating the number of quaternized nitrogen atoms in the polyamine; and z is an integer equal or greater than 1.

It is also preferable that R is a $C_8$–$C_{18}$ hydrocarbon radical, including $C_{18}$ unsaturated alkyl chains or their mixtures. Additionally, it is preferred that R is derived from natural fats and oils, such as tallow, rapeseed(canola), soya, tall oil, etc., giving an alkyl chain range of $C_{12}$–$C_{18}$, including unsaturated alkyl chains, and, more preferably, R is tallow alkyl or hydrogenated tallow alkyl. It is also preferable that $R^1$, $R^2$, and $R^3$ are, independently, methyl, ethan-2-ol, propan-2-ol, polyoxyethylene, and are, more preferably, methyl or ethan-2-ol. Preferably, x=1–6, more preferably, x=2 or 3 and, even more preferably, x=3.

The novel asphalt emulsifier of the present invention can be prepared by various methods within the knowledge of one of ordinary skill in the art. For example, they can preferably be derived from a diaminopropane such as N,N',N'trimethyl-N-tallow-1,3-propylene diamine reacted with sodium monochloroacetate (SMCA). Other polybetaines useful in the context of the present invention include but are not limited to:

- dibetaines prepared from N,N',N'tis(2-hydroxyethyl)-N-tallow-1,3 diaminopropane.
- polybetaines derived from tallow polytertiaryamines such as R—[N(CH$_3$)CH$_2$CH$_2$CH$_2$]$_a$—N(CH$_2$)$_2$ where a is an integer greater than 1.
- dibetaines or polybetaines prepared from other monohalocarboxylic acid salts such as X[CH$_2$]$_b$COONa where X=Cl, Br or I and b is an integer equal to or greater than 1.
- betaines by other routes such as alkylation of carboxymethylated polyamines.
- betaines prepared from ether polyamines.
- compounds having more than one carboxyalkyl group per nitrogen atom, and the like.

Preferred polyamine polybetaines include but are not limited to

Amines, N,N,N'-trimethyl-N'-tallowalkyl trimethylenedi-, N,N'-dicarboxymethyl, hydroxides, inner salt.
R=tallow, $R^1=R^2=R^3$=methyl, x=3, y=1, z=1.

Amines, N,N,N'-triethanol-N'-tallowalkyl trimethylenedi-, N,N'-dicarboxymethyl, hydroxides, inner salt.
R=tallow, $R^1=R^2=R^3$=CH$_2$CH$_2$OH, x=3, y=1, z=1.

Amines, N,N,N'-trimethyl-N'-cocoalkyl trimethylenedi-, N,N'-dicarboxymethyl, hydroxides, inner salt.
R=coco, $R^1=R^2=R^3$=methyl, x=3, y=1, z=1.

Amines, N,N,N'-triethanol-N'-cocoalkyl trimethylenedi-, N,N'-dicarboxymethyl, hydroxides, inner salt.
R=coco, $R^1=R^2=R^3$=CH$_2$CH$_2$OH, x=3, y=1, z=1.

Amines, N'-tallowalkyl trimethylenedi-, polyethoxylated, N,N'-dicarboxymethyl, hydroxides, inner salt.
R=tallow, $R^1=R^2=R^3$=polyoxyethanol, x=3, y=1, z=1.

Amines, N,N,N'-trimethyl-N'-[3-(C$_{12-18}$-alkyloxy)propyl] trimethylenedi-, N,N'-dicarboxymethyl, hydroxides, inner salt.
R=$R^4$—O—CH$_2$CH$_2$CH$_2$ where $R^4$ is C$_{12}$–C$_{18}$, $R^1=R^2=R^3$=methyl, x=3, y=1, z=1.

Amines, N,N,N'-trimethyl-N'-tallowalkyl trimethylenedi-, N,N'-dicarboxyethyl, hydroxides, inner salt.
R=tallow, $R^1=R^2=R^3$=methyl, x=3, y=1, z=2.

Amines, N,N,N',N"-tetramethyl-N"-tallowalkyl hexamethylenetri-, N,N',N"-tricarboxymethyl, hydroxides, inner salt.
R=tallow, $R^1=R^2=R^3$=methyl, x=3, y=2, z=1.

Amines, N,N'-dimethyl-N'-tallowalkyl trimethylenedi-, N,N,N'-tricarboxymethyl, hydroxides, inner salt.
R=tallow, $R^1=R^3$=methyl, $R^2$=carboxymethyl, x=3, y=1, z=1, and the The emulsifiers can either be used alone or together with known co-emulsifiers or emulsion stabilizers.

The polyamine polybetaines used in the invention can be prepared by various methods known to one of ordinary skill in the art. Generally, there are two preferred methods:

a) quaternization of a fatty tertiary polyamine with sodium chloroacetate or chloroacetic acid in water or aqueous alcohol; and b) quaternizing carboxymethylated or carboxyethylated polyamines with alkylating agents such as methyl chloride, ethyl chloride, dimethyl sulfate, ethylene oxide and the like.

Examples of such methods can be found in U.S. Pat. No. 3,555,079 and in *Amphoteric Surfactants,* Second Ed. Marcel Dekker, Inc. 1996, pp. 78–84. Both of the aforementioned documents are incorporated herein by reference.

The method of emulsifying asphalt in water according to the present invention uses an amount of polyamine polybetaine which is effective to emulsify asphalt in water. The effective amount is preferably about 0.3 to about 2.5%, more preferably about 0.5 to about 1.0%, by weight (as active matter). The inventive emulsion contains about 0.3 to about 2.5%, preferably about 0.5 to about 1.0%, by weight polyamine polybetaine emulsifier (as active matter), about 30–80% by weight asphalt, preferably about 55–70%, and the remainder water, except for small quantities of acid or alkali, e.g., HCl or NaOH, to adjust pH. Anionic emulsions are alkaline and cationic emulsions are acidic.

Other emulsifiers and emulsion additives can be included in the formulation to change the properties of the emulsion. These include thickeners, such as guar gum, stabilizers, such as aminolignin, quebracho, clays or lignin sulphonate, and additives, such as calcium chloride which is often used in cationic emulsions to control viscosity. Additives, such as polymers, can be added to either the asphalt phase or the soap phase to give improved properties to the residual asphalt. Solvents can be added to soften the asphalt.

Cold mixes are mixes of an emulsion of the above composition and aggregate (which may also include up to 100% reclaimed asphalt pavement), preferably about 2–25 parts of emulsion are present for every 100 parts of dry aggregate.

Asphalt emulsions are prepared by mixing the components at a temperature sufficient to soften the asphalt. Typically, the emulsifier, pH modifiers and additives (if any) are added to the water to prepare a 'soap' phase and this soap is then mixed with hot asphalt in a colloid mill (high shear mixer). Alternative methods are known in the asphalt emulsion industry.

The emulsions used in the examples were prepared as follows: The emulsifiers were dissolved or dispersed in the water, the pH of the water was adjusted by the addition of hydrochloric acid (for cationic emulsions) or sodium hydroxide (for anionic emulsions), then this soap was heated to 50° C., before mixing with hot asphalt (130° C.) in a laboratory colloid mill. The emulsions were produced at 70–90° C., then cooled to room temperature.

The properties of the emulsions were compared using tests described in ASTM methods and elsewhere, in order to illustrate the advantages of the invention.

The test methods used on the emulsions in Tables 2 and 3 are summarized below:

Appearance: This is not specified in the ASTM standard. In this test series, any skin was removed before further testing. The presence of skin is shown by coagulated emulsion on the surface of the emulsion and is a sign of poor emulsion quality. Broken emulsion means that the emulsion has coagulated throughout its mass soon after production, or that it failed to emulsify at all. A smooth homogeneous emulsion indicates no obvious coagulation.

Asphalt residue: This refers to asphalt content by distillation. The emulsions did not contain any solvent, so a simplified method (evaporation on a hot plate) was used. The residue is the weight of material (mainly asphalt) remaining after boiling off the water and it is expressed as a percentage of the original weight of emulsion.

Viscosity: This is a measure of the consistency of the emulsion. It was measured with a standard flow cup. The units are Saybolt Furol seconds (SFs) which represent the time taken in seconds for 60 ml of emulsion to flow out of the standard cup.

Particle charge: The test distinguishes cationic emulsions from anionic emulsions. Electrodes are placed in the emulsion. A current (initially 8 mA) is applied for 30 minutes and then the electrodes are examined for deposits of asphalt. Cationic emulsions deposit on the cathode.

Sieve test: The emulsion is passed through a pre-weighed 840 micron sieve. Any large asphalt particles are retained and weighed. The results refer to the weight of particles retained on the sieve expressed as a percentage of the original weight of emulsion.

Cement Mix Test: The test distinguishes slow-setting emulsions from other asphalt emulsions. The emulsion is mixed with cement. Then, the mixture is passed through a pre-weighed No. 14 mesh sieve. The residue on the sieve is weighed. The result of the test is the weight in grams retained on the sieve obtained from 100 ml of emulsion (diluted to a nominal 55% residue content) after mixing with cement. The residue consists of coagulated emulsion and cement.

Sand Coating test: This test has been designed to distinguish cationic slow setting emulsions from other emulsions in the event that the emulsions do not pass the cement mix test. The test involves mixing a standard sand with emulsion, allowing the mix to cure on the bench, then immersing the mix in boiling water for 10 minutes and reexamining the coating. Here, it is used to visually estimate the coating ability of the emulsion and the adhesion of the cured emulsion film to quartz. For this reason, it has also been applied to anionic emulsions. Emulsions giving good initial coating are suitable for mixing with aggregates. Emulsions giving good coating after immersion in boiling water will yield road materials showing good water resistance.

EXAMPLE 1

In this example slow setting emulsions (SS-1h Emulsions) were formulated with 160/180 penetration asphalt. The polybetaine emulsifiers of the present invention (ACD 41900) were compared to various commercially available emulsifiers. Redicote® E-47 is a nonionic slow-setting emulsifier available from Akzo Nobel Surface Chemistry LLC while Indulin® SAL is an anionic slow-setting emulsifier available from Westvaco Corporation. The results of the comparative testing are found Table 1.

TABLE 1

SS-1h emulsions made with 160/180 penetration asphalt

|  | ACD 41900 | Redicote E-47 | Indulin SAL | |
| --- | --- | --- | --- | --- |
| Emulsion ref. | 1952/436 | 1952/448 | 1952/439 | |
| Target AC, % | 62 | 62 | 62 | |
| Emulsifier, % | 1 | 1.2 | 2.5 | |
| NaOH, % | 0.02 | 0.01 | None | |
| Soap pH | 11.08 | 11.16 | 11.21 | |
| | | | | D 977 specification for SS-1h |

TABLE 1-continued

SS-1h emulsions made with 160/180 penetration asphalt

|  | ACD 41900 | Redicote E-47 | Indulin SAL | |
| --- | --- | --- | --- | --- |
| Asphalt residue | 62.0 | 61.6 | 62.4 | 57 minimum |
| Viscosity at 25° C., SFS | 47.7 | N/D | 25.8 | 20–100 |
| Median particle size (micron) | 4.6 | 2.5 | 2.6 | Not specified |
| Dilution test (ASTM D244) | Pass | Pass | Pass | Not specified |
| Cement mix test, % | 0.1 | −0.1 | 0.1 | 2 maximum |
| Sand coating test (initial), % | 100 | 100 | 100 | Not specified |
| Sand coating test (after boil), % | 95 | 70 | 0 | Not specified |

N/D = not determined

As can be seen from the data, the emulsifier according to the present invention, ACD 41900, forms anionic slow-setting emulsions at high pH. It is an effective emulsifier at a use-level substantially below Indulin® SAL and similar to Redicote® E-47. Additionally, it provides much better adhesion on quartz sand compared Indulin® SAL. Emulsions made from ACD 41900 also have higher viscosity than Indulin® SAL emulsions.

EXAMPLE 2

In this example slow setting emulsions (SS-1h Emulsions) made with 35 penetration asphalt were compared. A polybetaine emulsifier according to the present invention (ACD 41900) was compared to Arr-muls® 3015 which is a resin type anionic slow setting emulsifier supplied by Arr-maz. The comparative data are in Table 2.

TABLE 2

SS-1h emulsions made with 35 penetration asphalt

|  | ACD 41900 | Arr-muls 3015* | |
| --- | --- | --- | --- |
| Emulsion ref. | 1958/460 | 1958/464 | |
| Target AC, % | 67 | 67 | |
| Emulsifier, % | 2.0 | 3.0 | Active level same for both |
| NaOH, % | 0.05 | None | |
| Soap pH | 11.03 | 11.14 | |
| | | | D 977 specification for SS-1h |
| Asphalt residue | 68.0 | 68.0 | 57 minimum |
| Median particle size (micron) | 2.0 | 2.9 | Not specified |
| Cement mix test, % | 0.1 | 21.9 | 2 maximum |

*30% resin emulsifier

The data clearly show that the ACD 41900 according to the present invention forms anionic slow-setting emulsions that pass the cement mix test at a lower active use-level than resin emulsifier of the prior art.

EXAMPLE 3

In example 3, cationic slow setting emulsions (CSS-1 Emulsions) made with AC-20 asphalt were compared. ACD 41900 emulsifier according to the present invention was compared to Redicote® E-47 and Redicote® E-4868 which is a cationic slow-setting emulsifier available from Akzo Nobel Surface Chemistry LLC. The comparative test results are found in Table 3.

TABLE 3

CSS-1h emulsions made with AC-20 asphalt

| | ACD 41900 | Redicote E-4868 | Redicote E-47 | D 2397 specification for CSS-1h |
|---|---|---|---|---|
| Emulsion ref. | 1958/457 | 1952/372 | 1949/111/4 | |
| Target AC, % | 62 | 62 | 62 | |
| Emulsifier, % | 1.2 | 1.2 | 0.85 | |
| HCl (33%), % | 0.05 | 0.22 | 0.07 | |
| Soap pH | 1.98 | 1.95 | 2 | |
| Appearance | Smooth | Slight skin | Skin | Not specified |
| Asphalt residue | 60.7 | 62.4 | 61.2 | 57 minimum |
| Particle charge test (8 mA) | Pass | Pass | Pass | Positive |
| Median particle size (micron) | 4.8 | 3.8 | 3.6 | Not specified |
| Cement mix test, % | 0.1 | 0.1 | 0.2 | 2 maximum |
| Sand coating test (initial), % | 100 | 100 | 100 | Not specified |
| Sand coating test (after boil), % | 95 | 10 | 0 | 50 minimum* |

*only required if particle charge test is not passed.

As the data show, ACD 41900 forms cationic slow-setting emulsions at low pH. Additionally, the adhesion on quartz sand demonstrated by the ACD 41900 of the present invention is much improved over that of the Redicote E-4868 and Redicote E-47 emulsions.

What is claimed is:

1. A method of emulsifying asphalt in water comprising adding to a mixture of asphalt and water an emulsifying effective amount of at least one polyamine polybetaine.

2. The method of claim 1, wherein the polyamine polybetaine is a dibetaine.

3. The method of claim 1, wherein the polyamine polybetaine is ethoxylated.

4. The method of claim 1, wherein the emulsion formed is anionic, cationic and/or slow setting.

5. The method of claim 1, wherein the amount of polyamine polybetaine ranges from about 0.3% to about 2.5% by weight of the mixture.

6. The method of claim 5, wherein the amount of polyamine polybetaine ranges from about 0.5% to about 1.0% by weight of the mixture.

7. The method of claim 1, wherein said at least one polyamine polybetaine is selected from those of the following formula I:

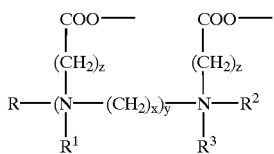

Formula I wherein R is a $C_8$–$C_{24}$ alkyl, alkenyl or a group of the formula $R^4$—O—$CH_2CH_2CH_2$, where $R^4$ is a $C^6$–$C^{20}$ hydrocarbon radical; $R^1$, $R^2$ and $R^3$ are, independently, a $C_1$–$C_6$ alkyl or alkanol; x is an integer greater than or equal to 1; y is an integer greater than or equal to 1; and z is an integer greater than or equal to 1 and acid salts thereof.

8. The method of claim 7 wherein R is selected from the group consisting of tallow, coco, and $R^4$—O—$CH_2CH_2CH_2$ wherein $R^4$ is a $C_8$–$C_{18}$ alkyl or alkenyl, (and $R^1$, $R^2$ and $R^3$ are independently selected from the group consisting of methyl, $CH_2CH_2OH$ and polyoxyethanol; x is 3, y is 1 and z is 1 or 2.

9. The method of claim 7, wherein the polyamine polybetaine is selected from the group consisting of N,N,N'-trimethyl-N'-tallowalkyl trimethylenedi-, N,N'-dicarboxymethyl, hydroxides; N,N,N'-triethanol-N'-tallowalkyl trimethylenedi-, N,N'-dicarboxymethyl, hydroxides; N,N,N'-trimethyl-N'-cocoalkyl trimethylenedi-, N,N'-dicarboxymethyl, hydroxides; N,N,N'-triethanol-N'-cocoalkyl trimethylenedi-, N,N'-dicarboxymethyl, hydroxides; N'-tallowalkyl trimethylenedi-, polyethoxylated, N,N'-dicarboxymethyl, hydroxides; N,N,N'-trimethyl-N'-[3-($C_{12-18}$-alkyloxy)propyl]trimethylenedi-, N,N'-dicarboxymethyl, hydroxides; N,N,N'-trimethyl-N'-tallowalkyl trimethylenedi-, N,N'-dicarboxyethyl, hydroxides; N,N,N', N''-tetramethyl-N''-tallowalkyl hexamethylenetri-, N,N',N''-tricarboxymethyl, hydroxides; N,N'-dimethyl-N'-tallowalkyl trimethylenedi-, N,N,N'-tricarboxymethyl, hydroxides; and mixtures thereof.

10. An asphalt emulsion which comprises water and at least one polyamine polybetaine in an amount effective to emulsify the asphalt in the water.

11. The emulsion of claim 10, wherein the polyamine polybetaine is a dibetaine.

12. The emulsion of claim 10, wherein the polyamine polybetaine is ethoxylated.

13. The emulsion of claim 10, wherein the emulsion is cationic, anionic and/or slow setting.

14. The emulsion of claim 10, wherein the effective amount of polyamine polybetaine ranges from about 0.3% to about 2.5% by weight of the mixture.

15. The emulsion of claim 14, wherein the effective amount of polyamine polyoxide ranges from about 0.5% to about 1.0% by weight of the mixture.

16. The emulsion of claim 10, wherein said at least one polyamine polybetaine is selected from those of the following formula I:

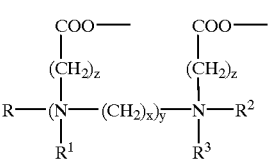

Formula I wherein R is a $C_8$–$C_{24}$ alkyl, alkenyl or a group of the formula $R^4$—O—$CH_2CH_2CH_2$, where $R^4$ is a $C^6$–$C^{20}$ hydrocarbon radical; $R^1$, $R^2$ and $R^3$ are, independently, a $C_1$–$C_6$ alkyl or alkanol; x is an integer greater than or equal to 1; y is an integer greater than or equal to 1; and z is an integer greater than or equal to 1; and acid salts thereof.

17. The emulsion of claim 16 wherein R is selected from the group consisting of tallow, coco, and $R^4$—O—$CH_2CH_2CH_2$ wherein $R^4$ is a $C_8$–$C_{16}$ alkyl or alkenyl, and $R^1$, $R^2$ and $R^3$ are independently selected from the group consisting of methyl, $CH_2CH_2OH$ and polyoxyethanol; x is 3, y is 1 and z is 1 or 2.

18. The emulsion of claim 16, wherein the polyamine polybetaine is selected from the group consisting of N,N,N'-trimethyl-N'-tallowalkyl trimethylenedi-, N,N'-dicarboxymethyl, hydroxides; N,N,N'-triethanol-N'-tallowalkyl trimethylenedi-, N,N'-dicarboxymethyl, hydroxides; N,N,N'-trimethyl-N'-cocoalkyl trimethylenedi-, N,N'-dicarboxymethyl, hydroxides; N,N,N'-triethanol-N'-cocoalkyl trimethylenedi-, N,N'-dicarboxymethyl, hydroxides; N'-tallowalkyl trimethylenedi-, polyethoxylated, N,N'-dicarboxymethyl, hydroxides; N,N,N'-trimethyl-N'-[3-($C_{12-18}$-alkyloxy)propyl]trimethylenedi-, N,N'-dicarboxymethyl, hydroxides; N,N,N'-trimethyl-N'-tallowalkyl trimethylenedi-, N,N'-dicarboxyethyl, hydroxides; N,N,N', N"-tetramethyl-N"-tallowalkyl hexamethylenetri-, N,N',N"-tricarboxymethyl, hydroxides; N,N'-dimethyl-N'-tallowalkyl trimethylenedi-, N,N,N'-tricarboxymethyl, hydroxides; and mixtures thereof.

19. A cold mix comprising the emulsion of claim 10 and aggregate.

20. The cold mix of claim 19, wherein the emulsion is present in an amount of about 2 to about 25% of the weight of the aggregate when the aggregate is dry.

* * * * *